Patented Jan. 9, 1951

2,537,777

UNITED STATES PATENT OFFICE 2,537,777

CHLOROFLUOROHEPTANES

Earl T. McBee, West Lafayette, Ind., assignor to the United States of America as represented by the United States Atomic Energy Commission No Drawing. Application April 5, 1946, Serial No. 659,851

10 Claims. (Cl. 260—653)

This invention relates to new halogenated organic compounds and to their manufacture.

The invention has for an object the manufacture of stable chlorofluoro derivatives of normal heptane and the provision of a novel process for making them.

The new compounds of the present invention are monochloro-, dichloro-, and trichloro-perfluoroheptanes. These compounds are stable, mobile liquids at ordinary atmospheric temperatures and are highly resistant to the action of oxidizing agents and especially highly reactive halides and the elemental halogens, including fluorine. The new monochloro-perfluoroheptanes $C_7ClF_{15}$, boil in the range 105.5–106.5° C. at standard atmospheric pressure, and have a density of 1.770 grams per milliliter at 20° C. and a refractive index of 1.295 at 20° C. The dichloro compounds, $C_7Cl_2F_{14}$, boil at 125.5–127.5° C. and have a density of 1.801 grams per milliliter at 20° C. and a refractive index of 1.331 at 20° C. The trichloro compounds boil in the range 155–158° C. The monochloro compounds are exceedingly stable and are inert to active fluorides, such as uranium hexafluoride, even at substantially elevated temperatures. The dichloro and trichloro compounds, while somewhat more reactive than the monochloro-perfluoroheptanes, are still relatively unreactive with such active reagents and may be considered inert under less rigorous conditions, for example, at low temperatures or at low concentrations.

The compounds of the invention are useful as sealants and as heat transfer media in either liquid or vapor phase. They are especially valuable for use in direct contact with chemicals that are highly reactive to hydrocarbons.

The compounds of the invention may be obtained by a number of methods. Thus they are obtainable by fluorination of polychloroheptanes by means of fluorinating agents capable of replacing residual hydrogen, such as silver difluoride and cobalt trifluoride. By varying the conditions of fluorination the number of residual chlorine atoms may be controlled to yield any or all of the desired products.

In producing the products of the invention substantial quantities of perfluoroheptane, $C_7F_{16}$, may be obtained as a by-product. The quantity of this material obtained is greater when a high degree of fluorination is effected, for instance, when the process is directed to the manufacture of monochloroperfluoroheptane.

A less expensive method for the manufacture of the products of the invention involves chlorination of normal heptane to a chlorine content of about 80–83% chlorine, by weight, corresponding to an average of 10 to 12 chlorine atoms per molecule, and treatment with antimony fluorochlorides or antimony pentafluoride to replace part of the chlorine by fluorine before completing the fluorination to replace residual hydrogen. This series of steps produces compounds of the general formulae $C_7H_xCl_3F_9$, $C_7H_xCl_2F_{10}$ and $C_7H_xClF_{11}$, from which the compounds of the invention are obtained by treatment with $AgF_2$ or $CoF_3$. These latter fluorinating agents not only replace residual hydrogen but also saturate carbon-carbon double bonds. The cost of such fluorinating agents is, in general, considerably greater than the cost of hydrogen fluoride and consequently the preliminary treatment, by reducing the quantity of costly reagent required, very materially reduces the cost of making the desired products. From this standpoint it is desirable that the product of the preliminary treatment have as high a fluorine content and as low a hydrogen content as possible. Since two fluorine atoms are required to introduce one fluorine atom in place of hydrogen or two fluorine atoms in place of a double bond, the presence of a double bond is preferable to hydrogen, particularly when the double bond is formed by dehydrochlorination.

The preliminary fluorination may be effected by means of hydrogen fluoride in the presence of fluorochlorides of pentavalent antimony to replace an average of about 6 to 9 chlorine atoms by fluorine atoms. The resulting product contains compounds with one, two, and three chlorine atoms, which may be further fluorinated to produce the novel products of the invention. It is desirable, though not necessary, to separate the more highly fluorinated products from the less fluorinated materials in order to minimize the quantities of the more costly fluorinating agents employed.

The hydrogen fluoride-antimony fluorochloride fluorination may be conducted in two stages, a low temperature initial fluorination and a high temperature final fluorination after regeneration of spent catalyst, thereby forming a product containing a high proportion of the monochloro, dichloro, and trichloro intermediates. This product may be fractionated and the more highly fluorinated materials may be treated with a fluorinating agent suitable for replacing residual hydrogen. The more highly chlorinated material may be returned to the hydrogen fluoride reactor for a subsequent treatment with hydrogen fluoride.

While the preferred fluorination process involves treatment with hydrogen fluoride in the presence of a pentavalent antimony halide catalyst, there are various alternative methods for accomplishing the same or similar results. Thus in place of this fluorinating agent, antimony pentafluoride may be employed; or the process may be conducted in a series of steps employing first the hydrogen fluoride treatment and then the antimony pentafluoride treatment. The fluorination with antimony pentafluoride usually can be carried to a somewhat higher average fluorine content than fluorination by means of hydrogen fluoride.

The antimony pentafluoride may be employed in one or more steps. Thus a single treatment with antimony pentafluoride at a temperature below 200° C. and at ordinary atmospheric pressure may be employed. Successive low temperature treatments with limited quantities of antimony pentafluoride introduce progressively greater proportions of fluorine whereas high temperature treatments at elevated pressures appear to cause substantial degradation of certain of the materials present in the reaction mass and consequently give poorer yields.

An autoclave treatment may be employed after the treatment with a fluorinating agent capable of removing residual hydrogen. The removal of residual hydrogen and saturation of double bonds appear to stabilize the product so that the autoclave treatment with antimony pentafluoride applied to this product does not cause degradation in the same degree as when such a treatment is applied before the hydrogen removal step.

In carrying out the preferred treatment in which polychlorinated normal heptane is treated with hydrogen fluoride in the presence of fluorochlorides of pentavalent antimony as the catalyst, it is preferred to conduct the fluorination in two stages. In the first stage hydrogen fluoride is passed slowly into the mixture of polychloroheptanes and catalyst maintained at a temperature between about 50° C. and about 150° C. At the end of this stage it is usually found that the antimony catalyst has been substantially reduced. Accordingly chlorine is introduced into the mixture to convert trivalent antimony to the pentavalent form, and after this has been accomplished, additional hydrogen fluoride is introduced to provide the antimony salts with as high a fluorine content as feasible, corresponding to the fluorine content of $SbCl_{1.5}F_{3.5}$ or better. This treatment restores the activity of the antimony salts. In the second stage the organic product is slowly distilled from the catalyst. The temperature is raised during this distillation to between 150° C. and 200° C. During this stage of the process further fluorination of the organic material occurs and an organic product having an average chlorine content between 3 and 4 atoms per molecule is produced. Fluorination in the second stage is accomplished primarily by the salts of pentavalent antimony, and the antimony is reduced from the pentavalent to the trivalent state during the operation. When pentavalent antimony fluorochlorides are present in the fluorination step in proportion corresponding to less than about two-fifths part by weight of antimony for each part by weight of polychloroheptanes, there is insufficient of the antimony fluorochlorides to effect a maximum fluorination during the subsequent distillation. As a consequence the product will not have as high a fluorine content as when this ratio is employed. On the other hand, higher ratios of the antimony salt do not appear to increase substantially the proportion of fluorine in the organic fluorination product, provided the antimony salts are properly regenerated before the distillation. It will be noted that while the antimony salts behave primarily as a halogen carrier during the hydrogen fluoride treatment, they act primarily as a fluorinating agent during the distillation and thus they perform a dual function in the overall fluorination process.

The organic distillate may be fractionated to recover the particular fraction desired for producing the monochloro, dichloro, or trichloro compounds and the higher boiling material may be recycled to the first fluorination step.

The organic distillate or desired fraction or fractions thereof may be washed to remove residual animony salts and then may be subjected to the final fluorination to remove residual hydrogen and to saturate any double bonds. This final step preferably is effected in vapor phase by means of cobalt trifluoride or silver difluoride at temperatures between 200° C. and 400° C.

Cobalt trifluoride and silver difluoride do not react with the partially fluorinated products in exactly the same way. Silver difluoride has been found to have a slightly greater tendency to remove a portion of the organic chlorine and to substitute fluorine in its place. The initial temperature of treatment with cobalt trifluoride, on the other hand, influences the course of the reaction, high initial temperatures favoring chlorine replacement; thus by employing an initial temperature above 300° C., the production of the monochloro derivatives is favored against the production of the dichloro and trichloro compounds. Normally with either reagent, a mixture of monochloro, dichloro, and trichloro derivatives is obtained containing a minor but substantial proportion of perfluoroheptane. Variations in selection of the distillate fraction to be treated and in selection of the temperature of final fluorination merely alter the proportions of these constituents in the final product.

In the treatment of a dodecachloroheptane with hydrogen fluoride in the presence of a pentavalent antimony catalyst several types of products are produced. Replacement of chlorine by fluorine produces chlorofluoroheptanes. Dehydrohalogenation may produce chlorofluoroheptenes or heptadienes. Cyclization may form chlorofluoromethylcyclohexanes or chlorofluoroethylcyclopentanes. Scission may produce similar derivatives containing less than 7 carbon atoms per molecule. By proper control of the reaction it is possible to provide a reaction product comprising mainly the chlorofluoroheptane and chlorofluoroheptene derivatives. Small quantities of other types of derivatives are present, however, even in these products. Consequently, a distillation curve of the product may show materials boiling throughout the range from about 50° C. up to 150° C. or 200° C. In the treatment of this product to replace residual hydrogen, the olefinic compounds may be saturated to produce compounds of the desired type or may be cyclized to produce cyclic compounds corresponding to those obtainable from the cyclic intermediates. By proper control of the final fluorination the proportion of products cyclized is maintained at a very small value. Since the olefinic compounds are capable of yielding the desired saturated compounds, it is normally not desirable to attempt to separate these compounds from the reaction mixture prior to the final treatment. Such a procedure is rendered further undesirable because of the complexity of the intermediate reaction product. However, among the 7-carbon chain derivatives, there is a gradually increasing chlorine content as the boiling temperature of the mixture rises and for this reason it is advantageous, in producing derivatives containing less than three chlorine atoms, to separate a fraction boiling up to about 140° C. and to return the higher boiling material to the first step to effect further fluorination in this step. The product of fluorination by means of cobalt trifluoride or silver difluoride may be fractionally distilled to produce concentrates of individual constituents of the desired composition. Monochloroperfluoroheptane, $C_7ClF_{15}$, is concentrated in a fraction boiling between 100° C. and 107° C., dichloroperfluoroheptane, $C_7Cl_2F_{14}$, is concentrated in a fraction boiling between 125° C. and 132° C. and trichloroperfluoroheptane, $C_7Cl_3F_{13}$, is concentrated in a fraction boiling between 154° C. and 158° C., at 750 mm. of mercury absolute pressure. Cyclic compounds are concentrated as follows: $C_7ClF_{13}$ in the fraction boiling at about 100° C., $C_7Cl_2F_{12}$ in the fraction boiling at about 130° C.

For many uses it is more advantageous and more convenient to employ the entire product or a distillate fraction of desired boiling range than to attempt to isolate individual components and employ them separately.

The following examples further illustrate the invention:

*Example 1*

This example illustrates a process in which an organic reaction product of treatment of a highly chlorinated heptane by hydrogen fluoride in the presence of halides of pentavalent antimony is separated from antimony salts and the latter are employed in succeeding treatments with hydrogen fluoride. Several successive stages are shown to illustrate the general procedure. The apparatus employed for carrying out the hydrogen fluoride step involved a Monel vessel provided with a water-cooled condenser with its exit leading through a copper trap, a sodium hydroxide scrubber, a calcium chloride drying tower, and a Dry Ice trichlorethylene trap, followed by a liquid air trap and a drying tube. The purpose of this complex recovery train was to insure complete recovery of volatile materials. The vessel was provided with a motor driven stirrer and an inlet for gaseous hydrogen fluoride, near the bottom.

One thousand twenty-four grams of a polychloroheptane mixture having a chlorine content corresponding to the average formula $C_7H_4Cl_{12}$ (obtained by photochemical chlorination of normal heptane by gaseous chlorine) and 1036 grams of antimony pentachloride (anhydrous) were placed in the reactor. One thousand one hundred twenty grams of anhydrous hydrogen fluoride was then introduced into the mixture in a period of four and three-quarter hours. The initial temperature was 25° C. and heat was applied by means of an oil bath to raise the temperature during the first quarter hour to 95° C. and thereafter to maintain it between 95° C. and 100° C. The reactor was then allowed to cool so as to cause the inorganic salts to solidify and settle to the bottom. The organic layer was then drawn off by means of a siphon. The organic product was washed with concentrated hydrochloric acid solution and then with sodium bicarbonate solution and finally was dried by means of anhydrous calcium sulfate. Four hundred sixty-six grams of product containing 44% chlorine and 31% fluorine was obtained.

The antimony salt catalyst residue in the reaction vessel was regenerated by passing 155 grams of chlorine through the residue while the temperature was maintained at 80° to 90° C. in the course of a one-hour period. One hundred eighty grams of fresh antimony pentachloride was then added to replace the antimony lost by vaporization.

One thousand forty-five grams of additional polychloroheptane mixture was added to the vessel and in the course of a two and one-half hour reaction period 1080 grams of hydrogen fluoride was passed into the reaction mixture while the temperature rose from an initial 55° C. in a half hour to 99° C. and was maintained thereafter at about 100° C. for two succeeding hours. The final temperature was 108° C. The organic material was separated as in the first stage. Six hundred eight-six grams of organic product was obtained containing 51% chlorine and 27% fluorine.

The residue in the reactor was treated with 660 grams of chlorine in a two and one-half hour period at a temperature of 60–75° C. and 180 grams of fresh antimony pentachloride was added.

One thousand forty-one grams of polychloroheptane mixture was added to the reactor and the mixture was treated with 1060 grams of hydrogen fluoride during four and one quarter hours. The initial temperature was 25° C. and the reaction mass proceeded to 98° C. in the first quarter hour. The reactor was thereafter maintained at a temperature between 95° and 103° C. After a reaction period of four and one-quarter hours the introduction of hydrogen fluoride was discontinued and the temperature of the reaction mixture was raised gradually at about 40° per half hour to a temperature of 180°. After a total reaction time of six and three quarter hours the reaction was stopped and the reactor allowed to cool. Organic material was separated as in the preceding stages. Seven hundred six grams of product containing 39% chlorine and 40% fluorine was obtained.

The residue in the reactor was treated with 360 grams of chlorine in a one hour period at a temperature of 70–80° C. and 180 grams of antimony pentachloride was added.

One thousand forty-five grams of polychloroheptane mixture was introduced and the reaction mixture was then maintained at a temperature of 94° to 100° C. for five hours while 985 grams of hydrogen fluoride was passed into the mixture. When the introduction of hydrogen fluoride had been completed, the mixture was heated gradually to 200° C. in a two and one-half hour period making a total reaction time of seven and one-half hours. The organic product recovered as distillate was washed with concentrated hydrochloric acid and then with aqueous sodium bicarbonate solution and dried with calcium sulfate. Four hundred thirty-five grams of a product containing 33% chlorine and 43% fluorine was obtained. An analysis of the wash water indicated that about 5% of the antimony catalyst had distilled over with the organic material.

The residue in the reactor was treated with 450 grams of chlorine at 70° to 90° C. in a period of one hour. One hundred eighty grams of antimony pentachloride was added.

One thousand fifteen grams of polychloroheptane mixture was introduced into the reactor and the reaction mixture was treated with 994 grams of hydrogen fluoride introduced in a period of five and one quarter hours while the temperature of the mixture was maintained between an initial temperature of 55° C. and a final temperature of 113° C.; for the last four and one-half hours of the reaction period the temperature was maintained at approximately 100° C. When introduction of hydrogen fluoride was completed, the reaction mixture was heated for a further period of two hours to a final temperature of 200° C. The organic distillate was washed in concentrated hydrochloric acid and then with sodium bicarbonate solution and dried with calcium sulfate. The distillate amounted to 525 grams of a product containing 32% chlorine and 44% fluorine.

The residue in the reactor was treated with 440 grams of chlorine in one hour at 75° to 85° C. and 150 grams of fresh antimony pentachloride was added.

One thousand twenty-two grams of polychloroheptane mixture was then introduced and 1000 grams of hydrogen fluoride was passed into the mixture in a period of four hours while the temperature was maintained at about 90° to 100° C. The temperature rose from an initial 25° C. to about 90° C. during the first half-hour of this treatment. After all the hydrogen fluoride had been added, the temperature of the mixture was raised gradually in two hours to 200° C. The resulting distillate was washed with concentrated hydrochloric acid and then with sodium bicarbonate solution and was dried with calcium sulfate. Seven hundred fifteen grams of organic product containing 33% chlorine and 44% fluorine was recovered. By testing the washings it was found that ¾ of the antimony had passed over with the distillate. The residue in the still was treated with 460 grams of chlorine in one hour at 75–90° C.

One thousand forty-four grams of polychloroheptane mixture was added and 1045 grams of hydrogen fluoride was then passed in in three and one quarter hours while the temperature was maintained at about 95–113° C. The temperature was then gradually raised over a two-hour period to 200° C. Part of the organic product was recovered as distillate and part was separated by siphoning off from the solid inorganic material in the still as previously described in connection with the first stage recovery. The distillate amounted to 491 grams of product containing 29% chlorine and 47% fluorine and the distillation residue amounted to 103 grams containing 35% chlorine and 43% fluorine. The residue in the reactor was treated with 250 grams of chlorine as in the previous batches.

One thousand twenty-eight grams of polychloroheptane mixture was added. One thousand seventy grams of hydrogen fluoride was then introduced in three and one-half hours while the temperature after being raised to about 90° C. in the first quarter hour was maintained at 90–100° C. After hydrogen fluoride had been added the temperature was further raised in a two-hour period to about 200° C. Five hundred eighty grams of distillate was obtained containing 35% chlorine. The data of this series are tabulated below for easier comparison.

| Stage No. | 1 | 2 | 3 | 4 | 5 | 6 | 7 | 8 |
|---|---|---|---|---|---|---|---|---|
| Weight $C_7H_xCl_{12}$ (gms.) | 1,024 | 1,045 | 1,041 | 1,045 | 1,015 | 1,022 | 1,044 | 1,028 |
| Weight HF (gms.) | 1,120 | 1,080 | 1,060 | 985 | 994 | 1,000 | 1,045 | 1,070 |
| Weight $SbCl_5$ (gms. added) | 1,036 | 180 | 180 | 180 | 180 | 150 | 0 | 0 |
| Weight $Cl_2$ (gms. added) | 0 | 155 | 660 | 360 | 450 | 440 | 460 | 250 |
| Temp., HF Step, °C | 86–107 | 96–108 | 91–103 | 94–103 | 67–113 | 88–103 | 95–113 | 90–100 |
| Time, HF Step (hrs.) | 4¾ | 2½ | 4¼ | 5 | 5¼ | 4 | 3¼ | 3¼ |
| Temp., Distillation (Max.) °C. (or Heat Treatment) | | | 180 | 200 | 200 | 200 | 200 | 200 |
| Time, Distillation (hrs.) (or Heat Treatment) | | | 2½ | 2¼ | 2 | 2 | 2 | 2 |
| Weight Product | 466 | 686 | 706 | 435 | 525 | 715 | 594 | 580 |
| Analysis, per cent F | 31 | 27 | 40 | 43 | 44 | 44 | 47 and 42 | 46 |
| Analysis, per cent Cl | 44 | 51 | 39 | 33 | 32 | 33 | 29 and 35 | 32 |

From the halogen analyses given above it will be seen that the products contained from 6 chlorine atoms and 6 fluorine atoms in the second stage product to 3 chlorine atoms and 9 fluorine atoms in the seventh stage distillate. All of these products are suitable for conversion to the mono, di, and trichlorides of perfluoroheptane in accordance with the present invention. This will be illustrated by the cobalt trifluoride treatment of the eighth stage product containing 3.5 atoms of chlorine and 8.5 atoms of fluorine per molecule.

Two hundred grams of the product of stage 8 was passed in vapor phase at the rate of 100 grams per hour over three beds of cobalt trifluoride maintained, respectively, at 160° C., 250° C., and 345° C. Two hundred seventeen grams of reaction product was recovered. Upon distillation with rectification the following volume percentage recoveries were obtained:

| Vapor Temperature | Proportion of Distillate |
|---|---|
| | Percent |
| 60° to 100° C | 7 |
| 100° to 106° C | 16 |
| 127° to 129° C | 42 |
| 153° to 156° C | 35 |

The product thus comprises mainly dichloroperfluoroheptane and trichloroperfluoroheptane.

*Example 2*

In the eleventh and twelfth stages of the series of fluorination treatments described in Example 1, after regeneration of catalyst and addition of 70 grams of fresh antimony pentachloride 1242 grams of polychloroheptane mixture ($C_7H_xCl_{12}$) was added to the reactor and 990 grams of hydrogen fluoride was introduced while the temperature was raised from an initial temperature of 58° to about 100° C. After the hydrogen fluoride had been added the temperature was raised in a two-hour period to a final temperature of 200° C. The total reaction time was four and three quarter hours. During this process only 79 grams of product distilled over. The distillation residue, without further addition of polychloroheptane or antimony pentachloride was treated with 770 grams of hydrogen fluoride at a temperature rising from 85° to 100° C. in a period of three hours. After the antimony salts had been regenerated by treatment with 400 grams of chlorine, the temperature was raised to 200° C. in a two-hour period. Four hundred ninety-four grams of organic distillate and 171 grams of organic distillation residue were obtained. The distillate according to halogen analyses corresponded approximately to a compound containing 3 chlorine atoms and 9 fluorine atoms per molecule. The halogen analyses of the residue corresponded to a product containing 4 chlorine atoms and 8 fluorine atoms per molecule. The distillate and organic residue were mixed to give a product having a boiling range of 80–154° C. and halogen analyses corresponding to the general formula $C_7H_2Cl_{3.5}F_{8.5}$. Two hundred grams of this product was vaporized and the vapor was passed through a series of three beds of cobalt trifluoride maintained, respectively, at 315°, 330°, and 350° C. The rate of passage was 100 grams per hour. Two hundred five grams of product of the following distillation characteristics was obtained.

| Vapor Temperature | Proportion of Distillate |
|---|---|
| | Percent |
| 40° to 80° C | 8 |
| 80° to 83° C | 10 |
| 102° to 106° C | 38 |
| 127° to 129° C | 37 |
| above 154° C | 7 |

The analysis of the 102–106° C. distillate (10% chlorine and 69% fluorine) and its molecular weight of 396 indicate that this product was composed mainly of $C_7ClF_{15}$.

A comparison of this product with that obtained in Example 1 indicates that the higher temperature employed in the cobalt trifluoride fluorination step resulted in conversion of a substantially greater proportion of the material to monochloroperfluoroheptane with a corresponding reduction in the proportion of the trichloro compounds obtained. A substantially larger proportion of the perfluoroheptane was present in the product in Example 2 and a slightly smaller proportion of the dichloro compound.

*Example 3*

Two thousand grams of polychloroheptane product of 81.7% chlorine content and 900 grams of antimony pentachloride were introduced into a Monel reactor and treated with 890 grams of hydrogen fluoride at a temperature of 120° C. The hydrogen fluoride was introduced gradually to avoid an increase of pressure. When all of the hydrogen fluoride was absorbed, the product was recovered; it contained 57% chloride and 22% fluorine.

This product was treated in an aluminum reactor with 1500 grams of antimony pentafluoride at a temperature rising from 20° to 180° C. during a 12½ hour reaction period. The product contained 22.5% chlorine and 54% fluorine.

Six hundred fifty-six grams of this product was passed in vapor phase into contact with silver difluoride in three reactors maintained, respectively, at the temperatures 175° C., 250° C., and 325° C. Seven hundred fifty-two grams of product containing 15% chlorine and 63% fluorine was obtained.

Two hundred grams of the product was mixed with 309 grams of antimony pentafluoride in an aluminum autoclave and heated at 200° C. for 24 hours. One hundred sixty-eight grams of organic product containing 9.6% chlorine and 70% fluorine corresponding to an average formula, $C_7ClF_{15}$, was obtained.

*Example 4*

Fifteen hundred and fifty-six grams of a polychloroheptane, which had been obtained by the photochemical chlorination of normal heptane at a temperature of 15° to 115° C., and 680 grams of antimony pentachloride were introduced into a Monel reactor and 670 grams of hydrogen fluoride was introduced gradually into the mixture, which was maintained at 100° C., in a three hour period. The reaction product contained 57% chlorine and 21% fluorine.

One thousand ninety-five grams of this product and 2200 grams of antimony pentafluoride were introduced into an aluminum reactor and heated for 12½ hours at 180° C. The product contained 55% fluorine and 23% chlorine.

Six hundred twenty grams of this product was passed into contact with silver difluoride in three reaction chambers at successively increasing temperatures of 245°, 280° and 335° C., respectively. Six hundred thirty-eight grams of product containing 13.7% chlorine and 65% fluorine was obtained.

Three hundred grams of this product was mixed with 454 grams of antimony pentafluoride and heated in an aluminum autoclave at 200° C. for 24 hours. Two hundred thirty-two grams of organic product containing 9.3% chlorine and 71% fluorine was obtained.

It will be understood that I intend to include variations and modifications of the invention and that the preceding examples are illustrations only and in no wise to be construed as limitations upon the invention, the scope of which is defined in the appended claims, wherein I claim:

1. As new mixtures of isomeric compounds, the chlorine substituted normal perfluoroheptanes containing from 1 to 3 chlorine atoms per molecule, which compounds are stable liquids resistant to oxidizing agents and boiling at normal atmospheric pressure between 100° C. and 160° C.

2. A new mixture of isomeric compounds having the molecular formula $C_7ClF_{15}$, being a clear colorless liquid boiling between 105.5° C. and 106.5° C. and having a density of about 1.77 grams per milliliter at 20° C. and a refractive index of about 1.30 at 20° C.

3. A new mixture of isomeric compounds having the molecular formula $C_7Cl_2F_{14}$, being a clear colorless liquid boiling between 125.5° and 127.5° C. and having a density of about 1.80 grams per milliliter at 20° C. and a refractive index of about 1.33 at 20° C.

4. A new mixture of isomeric compounds having the molecular formula $C_7Cl_3F_{13}$, being a clear colorless liquid boiling between 155° C. and 158° C.

5. The method of making new chlorofluoro derivatives of normal heptane, which comprises treating a chlorinated normal heptane containing at least about 80% of chlorine with fluorochlorides of pentavalent antimony, separating resulting chlorofluoroheptane derivatives from antimony salts and reacting said derivatives with a fluorinating agent of the group consisting of silver difluoride and cobalt trifluoride.

6. The method of making new chlorofluoro derivatives of normal heptane, of high fluorine content, which comprises treating a chlorinated normal heptane containing at least about 80% of chlorine with fluorochlorides of pentavalent antimony containing at least 3 fluorine atoms per antimony atom at temperatures rising gradually from a starting temperature below about 100° C. to a final temperature between 150° C., and 200° C., separating the resulting chlorofluoroheptane derivatives from antimony salts and reacting said derivatives in vapor phase with cobalt trifluoride so as to remove residual hydrogen atoms and form a saturated chlorofluoro normal heptane derivative containing no more than three chlorine atoms per molecule.

7. The method of making new chlorofluoro normal heptane derivatives of high fluorine content, which comprises treating a chlorinated normal heptane containing at least about 80% of chlorine with hydrogen fluoride in the presence of anhydrous fluorochlorides of pentavalent antimony at a temperature of about 100° C. so as to replace a major proportion of the organic chlorine by fluorine, separating the resulting organic chlorofluoro product into a low-boiling fraction and a high-boiling fraction and reacting the low-boiling fraction with cobalt trifluoride at a temperature between 250° C. and 400° C. so as to replace residual hydrogen by fluorine and produce a saturated chlorofluoro normal heptane derivative containing not more than three chlorine atoms in the molecule.

8. The method of making new chlorofluoro derivatives of normal heptane, which comprises treating chlorinated normal heptanes containing at least about 80% of chlorine with hydrogen fluoride in the presence of anhydrous fluorochlorides of pentavalent antimony so as to replace a major proportion of the organic chlorine by fluorine, separating chlorofluoro derivatives boiling below 140° C. from high-boiling reaction products and reacting said low-boiling derivatives with cobalt trifluoride at a temperature between 300° C. and 400° C. so as to replace residual hydrogen and form a saturated chlorofluoro compound mixture containing monochloro-, dichloro-, and trichloro-perfluoroheptanes.

9. The method of making chlorofluoroheptanes containing from 1 to 3 chlorine atoms per molecule, which comprises treating a chlorinated normal heptane mixture containing between 80% and 83% of organic chlorine, in the presence of at least two-fifths its weight of antimony present as chlorofluorides of pentavalent antimony, with anhydrous hydrogen fluoride at a temperature of about 100° C. so as to replace a major proportion of the organic chlorine by fluorine, reactivating the antimony chlorofluorides by means of chlorine and hydrogen fluoride, distilling off from the chlorofluorides of pentavalent antimony, an organic distillate fraction normally boiling below 140° C., said distillation being conducted to a final distillation temperature of at least 150° C. at not substantially less than atmospheric pressure, vaporizing the distillate fraction and passing the vapor into contact with cobalt trifluoride at a temperature between 300° C. and 400° C. so as to replace residual hydrogen and form a mixture of saturated chlorofluoro normal heptanes containing 1, 2, and 3 chlorine atoms per molecule.

10. The method of making new chlorofluoro derivatives of normal heptane which comprises treating a chlorinated normal heptane containing at least about 80% of chlorine with an anhydrous fluoride of pentavalent antimony and reacting the fluorinated organic product thus obtained with a fluorinating agent of the group consisting of silver difluoride and cobalt trifluoride.

EARL T. McBEE.

REFERENCES CITED

The following references are of record in the file of this patent:

UNITED STATES PATENTS

| Number | Name | Date |
|---|---|---|
| 2,230,925 | Benning | Feb. 4, 1941 |
| 2,394,581 | Benning et al. | Feb. 12, 1946 |

OTHER REFERENCES

Locke et al.: J. A. C. S., vol. 56, pages 1726–28 (1934).

McBee et al.: J. A. C. S., vol. 62, pages 3340–41 (1940).